(12) United States Patent
Bursztyn et al.

(10) Patent No.: US 11,914,635 B2
(45) Date of Patent: Feb. 27, 2024

(54) PERFORMING IMAGE SEARCH BASED ON USER INPUT USING NEURAL NETWORKS

(71) Applicant: ADOBE INC., San Jose, CA (US)

(72) Inventors: Victor Soares Bursztyn, Chicago, IL (US); Jennifer Anne Healey, San Jose, CA (US); Vishwa Vinay, Bangalore (IN); Tong Sun, San Ramon, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 17/455,786

(22) Filed: Nov. 19, 2021

(65) Prior Publication Data

US 2023/0161808 A1 May 25, 2023

(51) Int. Cl.
*G06F 16/532* (2019.01)

(52) U.S. Cl.
CPC ................... *G06F 16/532* (2019.01)

(58) Field of Classification Search
CPC .................................................. G06F 16/532
See application file for complete search history.

(56) References Cited

U.S. PATENT DOCUMENTS

| | | | | |
|---|---|---|---|---|
| 2017/0148222 A1* | 5/2017 | Holzer | .................. | H04N 23/698 |
| 2017/0185670 A1* | 6/2017 | Dua | ....................... | G06F 40/169 |
| 2018/0181592 A1* | 6/2018 | Chen | .................... | G06F 16/5866 |
| 2019/0251612 A1* | 8/2019 | Fang | ..................... | G06F 16/532 |
| 2020/0193153 A1* | 6/2020 | Lee | ....................... | G06V 30/418 |
| 2020/0334809 A1* | 10/2020 | Vianu | ................. | G06V 30/1916 |
| 2021/0209261 A1* | 7/2021 | Reynolds | ................ | G06F 30/27 |
| 2022/0318296 A1* | 10/2022 | Vang | ........................ | G06N 3/04 |

OTHER PUBLICATIONS

1Radford et al., "Learning Transferable Visual Models From Natural Language Supervision", arXiv preprint arXiv:2103.00020v1 [cs.CV] Feb. 26, 2021, 48 pages.
2Bursztyn, et al., "It doesn't look good for a date", Transforming Critiques into Preferences for Conversational Recommendation Systems, arXiv preprint arXiv:2109.07576v1 [cs.CL] Sep. 15, 2021, 6 pages.
3Bursztyn et al., "Developing a Conversational Recommendation System for Navigating Limited Options", arXiv preprint arXiv:2104.06552v1 [cs.CL] Apr. 13, 2021, 7 pages.

(Continued)

*Primary Examiner* — Richard L Bowen
*Assistant Examiner* — Aryan D Toughiry
(74) *Attorney, Agent, or Firm* — F. CHAU & ASSOCIATES, LLC

(57) ABSTRACT

Systems and methods for image searching are described. The systems and methods include receiving a search query comprising user input for a reference image; converting the user input for the reference image to a preference statement using a machine learning model; encoding the preference statement in an embedding space to obtain an encoded preference statement; combining the encoded preference statement with an encoded reference image representing the reference image in the embedding space to obtain a multi-modal search encoding; and performing a search operation using the multi-modal search encoding to retrieve a second image, wherein the second image differs from the reference image based on the user input for the reference image.

20 Claims, 12 Drawing Sheets

(56) References Cited

OTHER PUBLICATIONS

4Brown et al., "Language Models are Few-Shot Learners", arXiv preprint arXiv:2005.14165v1 [cs.CL] Jul. 22, 2020, 75 pages.
5Butterfield, 2019, "Powering Search Using Natural Language, Machine Learning, & AI", In the 2019 Rasa Developer Summit, Available at: https://www.youtube.com/watch?v=27OYuIL_jdk.
6Vo et al., "Composing Text and Image for Image Retrieval—An Empirical Odyssey", arXiv preprint arXiv:1812.07119v1 [cs.CV] Dec. 18, 2018, 9 pages.
7Kovashka et al., "WhittleSearch: Image Search with Relative Attribute Feedback", In Proceedings of the IEEE/CVF Conference on Computer Vision and Pattern Recognition, 2012 (pp. 2973-2980).
8Zhang et al., "Reward Constrained Interactive Recommendation with Natural Language Feedback", In 33rd Conference on Neural Information Processing Systems (NeurIPS 2019), pp. 1-11.
9Guo et al., "Dialog-based Interactive Image Retrieval", arXiv preprint arXiv: 1805.00145v3 [cs.CV] Dec. 20, 2018, pp. 1-17.

* cited by examiner

PERFORMING IMAGE SEARCH BASED ON USER INPUT USING NEURAL NETWORKS

BACKGROUND

The following relates generally to search, and more specifically to image searching.

Search refers to the process of applying a query to retrieve information. Files such as music, images, and text may be stored (and subsequently retrieved) based on a data structure including associated tags or vector representations. When searching is performed, a computer application can evaluate a large amount of information in a short period of time because the tags or vectors are compared rather than the information in the file itself.

For example, images can be searched via text-based queries. However, in some cases, a user may attempt to use vague or critique-based search queries when searching for images. This can be a challenge for conventional search systems that only understand certain explicitly described keywords, and therefore may not understand the user's query.

A search system's inability to understand such attempted critique-based image queries can lead to undesirable search results and a consequent diminishment of the user's creative expression. Furthermore, this inability to understand the user's query may lead to a user inputting a series of independent queries into the system in an attempt to return the kind of images they are looking for. This can be time-consuming and inefficient and can make tracking and recovering the relationships between two sequential queries difficult, which can hinder organizational and collaborative processes. Therefore, there is a need in the art for improved search systems that can retrieve images based on critical queries that reference previous search results.

SUMMARY

The present disclosure describes systems and methods for image searching that provide a neural network-based machine learning model to understand a user's response to displayed images to obtain refined search results. In some examples, a user selects a reference image in a user interface and enters a query including a user input into the interface. The user input is converted by a neural network into a preference statement according to the machine learning model. The preference statement is encoded by a second neural network and combined with an encoded reference image to produce a multi-modal search encoding. A second image is retrieved from an image dataset based on the multi-modal search encoding, and the second image differs from the reference image based on the user input.

A method, apparatus, non-transitory computer readable medium, and system for image searching are described. One or more aspects of the method, apparatus, non-transitory computer readable medium, and system include receiving a search query comprising user input for a reference image; converting the user input for the reference image to a preference statement using a machine learning model; encoding the preference statement in an embedding space to obtain an encoded preference statement; combining the encoded preference statement with an encoded reference image representing the reference image in the embedding space to obtain a multi-modal search encoding; and performing a search operation using the multi-modal search encoding to retrieve a second image, wherein the second image differs from the reference image based on the user input for the reference image.

An apparatus, system, and method for image searching are described. One or more aspects of the apparatus, system, and method include receiving training data comprising a plurality of input statements and a plurality of ground truth preference statements corresponding to the input statements; converting a user input of the plurality of input statements to a preference statement using a machine learning model; computing a loss function for the machine learning model by comparing the preference statement to a corresponding preference statement from the plurality of ground truth preference statements; and training the machine learning model using the training data to generate a trained machine learning model, the trained machine learning model being configured to perform a search operation to retrieve an image that matches a query preference statement corresponding to a user input.

DETAILED DESCRIPTION

Figure 1:
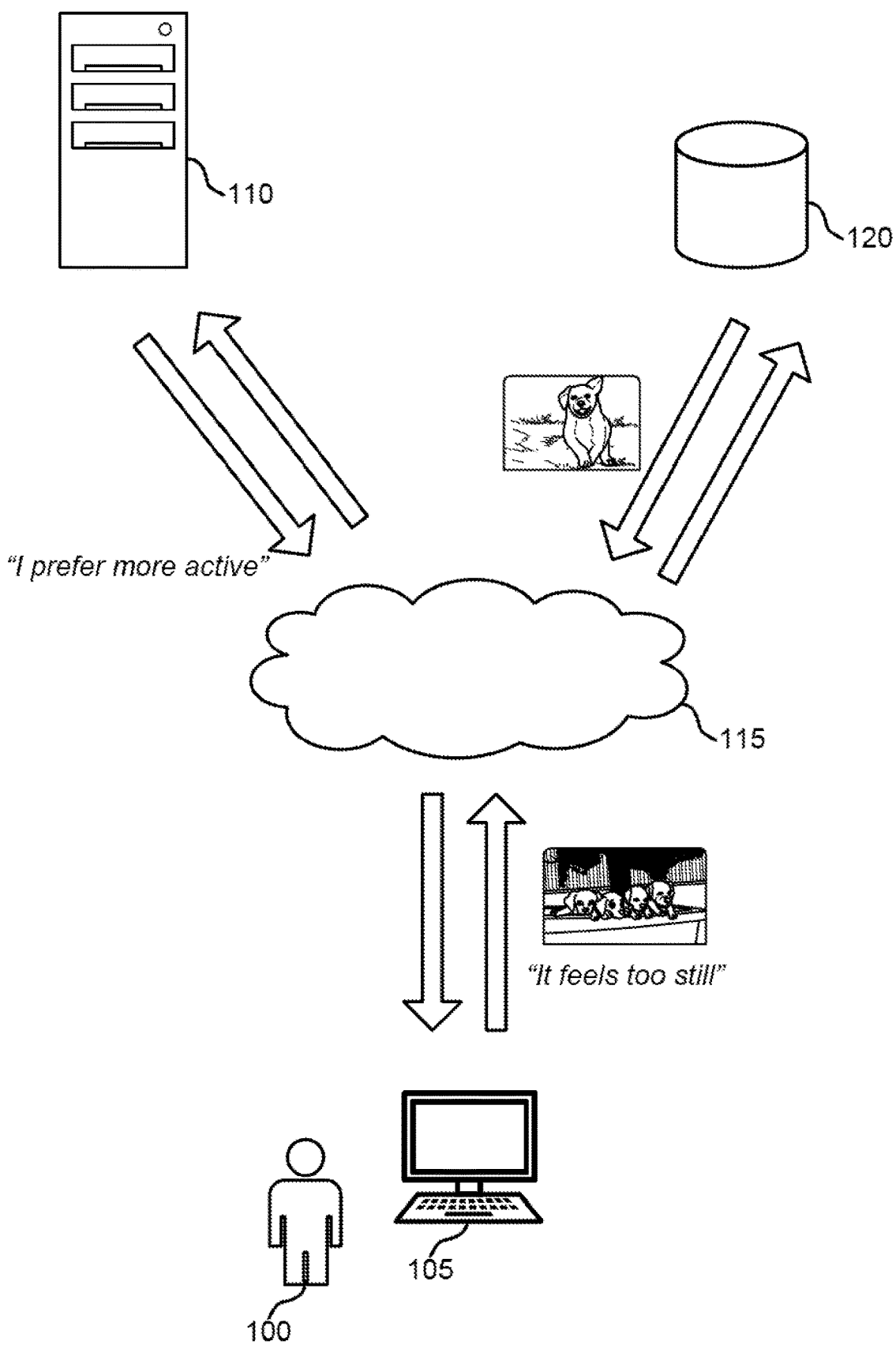
FIG. 1 shows an example of an image search system according to aspects of the present disclosure.

Searching is a process of structuring and parsing data to provide fast and accurate information retrieval. Image searching applications are examples of search system. Conventional image searching systems use keyword-based indexing to provide initial search results in response to a query, or to provide additional search results in response to an additional query added to a displayed reference image. However, if the user-entered keywords are not explicitly understood by the system, the system will not return user-desired results, leading to a long and inefficient search process that is difficult to track and organize. Furthermore, conventional image searching systems may have some ability to process queries that are expressed in natural language, but these queries must be explicitly recognized by the systems (for example, a user instruction to refine search results based on an object's position or color).

For example, some image search engines provide for keyword-based queries and include support to specific types of refinements expressed in natural language. Additionally, enforcing a certain position or color to an image object may be done using a search engine. However, conventional search engines cannot interpret refinements that are not explicitly described.

For example, a search engine may not be able to understand a user utterance such as "Make this image more exciting with happy puppies". Similarly, the search engine may not be capable of understanding or interpreting critiques (i.e., negative statements). For example, the search engine may not understand that a user utterance such as "It still feels a bit boring" means "I prefer it more exciting or interesting". Rather, conventional image retrieval systems use single-turn image retrieval. Furthermore, conventional multi-turn image retrieval techniques predefine the feature space, require oversimplified language, and assume that users have a clear vision of the final search target. For example, a conventional multi-turn retrieval technique may assume that users will explicitly mention a missing feature and not imply the feature through a critique. Therefore, conventional image retrieval systems are incapable of refining search queries based on a critique of search results.

Embodiments of the present disclosure can reason about image objects and resolve critiques by applying deep learning language models in the context of cross-modal image searching, providing for a natural conversational search. One or more embodiments use a technologically advantageous neural network-based machine learning model to understand a query that includes an unrestricted natural language user input and provide a second image that differs from a reference image based on the user input.

By converting the user input into a preference statement, obtaining a multi-modal search encoding based on the preference statement, and retrieving a second image based on the multi-modal search encoding, a machine learning model described by the present disclosure can avoid dependence on explicitly understood keywords or natural language search terms, and is instead able to provide refined search results in response to a user preference that is expressed in natural language, thereby providing the user with a more efficient and trackable image searching experience than those provided by conventional image searching systems.

Embodiments of the present disclosure provide systems and methods for text-based image searching that allow a user to search for images using natural language. For example, a user can provide a query (such as a critique of a displayed reference image) to an image search apparatus using conversational-style prompts that respond to previous search results (i.e., a reference image). The image search apparatus can then process the reference image and the initial query with one or more neural networks to produce a modified search query.

For example, a neural network can convert an initial query that expresses a negative opinion about the reference image (such as "It seems a bit boring") to a preference statement (such as "I prefer more exciting"), and the image search apparatus can combine the preference statement and the reference image to produce the modified search query. The image search apparatus can then provide additional images to the user based on the modified search query. This search process may be repeated until satisfactory images are retrieved.

Accordingly, embodiments of the present disclosure allow the user to search for images without being constrained by either keyword-based searching, or by particular and narrowly understood natural language queries. This enables a natural and efficient search process for the user that more readily produces desirable results that match a user's expectations. In some embodiments, a record of the search process can be kept (including comments or critiques of particular images), allowing for a greater degree of collaboration between multiple users working on a project together.

Embodiments of the present disclosure may be used in an image searching context. For example, an image search apparatus based on the present disclosure may retrieve images from a dataset based on a combination of reference images, natural language utterances, preference statements, and generated captions. An example application of the inventive concept in the image searching context is provided with reference to FIGS. 1-3. Details regarding the architecture of an example image search apparatus are provided with reference to FIGS. 4-5. Examples of a process for image searching are provided with reference to FIGS. 6-11. An example training process is described with reference to FIG. 12.

Image Search System

FIG. 1 shows an example of an image search system according to aspects of the present disclosure. The example shown includes user 100, user device 105, image search apparatus 110, cloud 115, and database 120.

In the example of FIG. 1, one or more users 100 can provide an initial query to image search apparatus 110 via user device 105 and cloud 115. Image search apparatus 110 can retrieve results from database 120 via cloud 115 based on the query. A user can select a reference image from the results and input a critique of the reference image. Image search apparatus 110 can generate a preference statement based on the critique, retrieve one or more second images from database 120 based on a combination of the reference image, critique, and preference statement, and return the one or more second images to the one or more users 100.

One or more users 100 communicates with the image search apparatus 110 via one or more user devices 105 and the cloud 115. A user device 105 may be a personal computer, laptop computer, mainframe computer, palmtop computer, personal assistant, mobile device, or any other suitable processing apparatus. one or more users 100 may interact with user device 105 via a user interface and an input component. An input device may be a computer mouse, keyboard, keypad, trackball, and/or voice recognition device. An input component may include any combination of devices that allow users to input information into a computing device, such as buttons, a keyboard, switches, and/or dials. In addition, the input component may include a touch-screen digitizer overlaid onto the display that can sense touch and interact with the display. A user interface enables a user to interact with user device 105.

In some embodiments, the user interface may include an audio device, such as an external speaker system, an external display device such as a display screen, or an input device (e.g., remote control device interfaced with the user interface directly or through an IO controller module). In some cases, a user interface may be a graphical user interface (GUI). In some examples, the user device 105 includes software that can prompt a user for an initial query, request results from image search apparatus 110 based on the query, display the results to the user, allow the user to select a reference image from the results, input a critique of the reference image, provide the critique and the reference image to image search apparatus 110, and display one or more second images received from image search apparatus 110. In some cases, the user interface is a conversational interface. In the conversation interface, the one or more users can utter free-form search queries, visualize search results, and select a particular result to continue refining the search results either with positively stated preferences (e.g., "I prefer more cheerful") or with critiques (e.g., "It seems a bit boring").

Image search apparatus 110 can include a computer implemented network comprising a training component, a search component, and a machine learning model. Image search apparatus 110 can also include one or more processors, a memory subsystem, a communication interface, an I/O interface, one or more user interface components, and a bus. Additionally, image search apparatus 110 can communicate with user device 105 and database 120 via cloud 115.

In some cases, image search apparatus 110 is implemented on a server. A server provides one or more functions to users 100 linked by way of one or more of the various networks. In some cases, the server includes a single microprocessor board, which includes a microprocessor responsible for controlling all aspects of the server. In some cases, a server uses microprocessor and protocols to exchange data with other devices/users 100 on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus.

In some cases, image search apparatus 110 allows one or more users 100 to incrementally refine search results using multi-modal queries that combine a reference image and one or more natural language statements. For example, a reference image that depicts a puppy can be combined with a user input (e.g., "I prefer more cheerful") to generate a preference statement such as "I prefer the puppies jumping, running, or playing". In some cases, the user input can include a critique of the reference image, such as "It still looks a bit boring" or "That's too clean for a day in the park". In some cases, image search apparatus 110 does not predefine the feature space of the user input or make assumptions about the type of language that constitutes a critique.

In some cases, image search apparatus 110 includes an architecture that is based on text-based image retrieval and multi-modal image retrieval processes with cross-modal embeddings and critique understanding process with natural language generation. For example, in some cases, image search apparatus 110 can perform text-based image retrieval with cross-modal embeddings. In some cases, image search apparatus 110 can perform multi-modal image retrieval with cross-modal embeddings. In some cases, image search apparatus 110 can perform critique understanding with controllable natural language generation. In some cases, the image retrieval is based on maximizing the similarity of images in a dataset with respect to an expanded search query. In some cases, image search apparatus 110 retrieves images after shapes of concatenated vectors match.

In some cases, image search apparatus 110 includes a machine learning model that includes one or more artificial neural networks. An artificial neural network (ANN) is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

During a training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

The term "loss function" refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly, and a new set of predictions are made during the next iteration.

In some embodiments, supervised learning is used. The term "supervised learning" refers to one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

Figure 4:
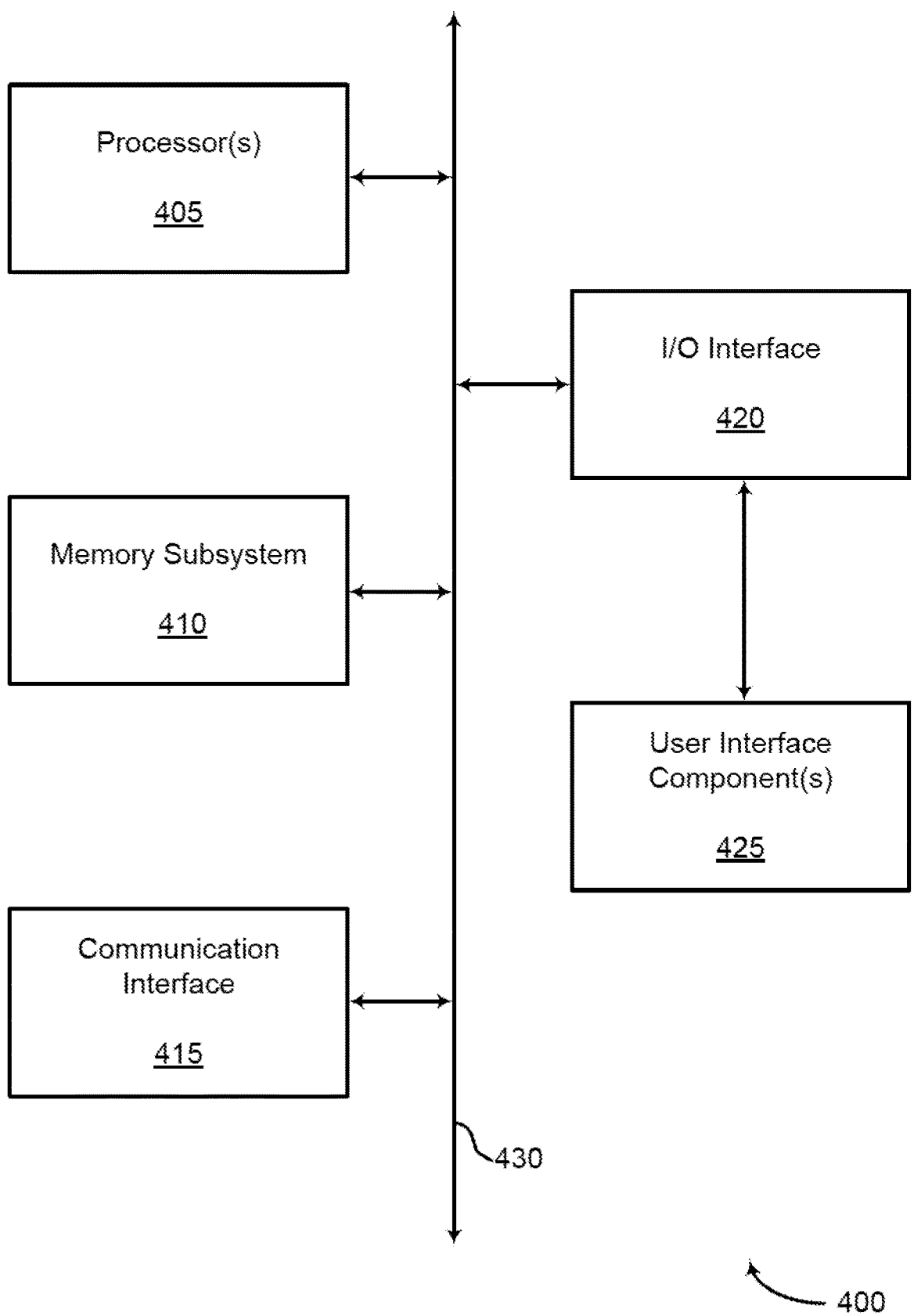
FIG. 4 shows an example of a computing system for image searching according to aspects of the present disclosure.
Figure 5:
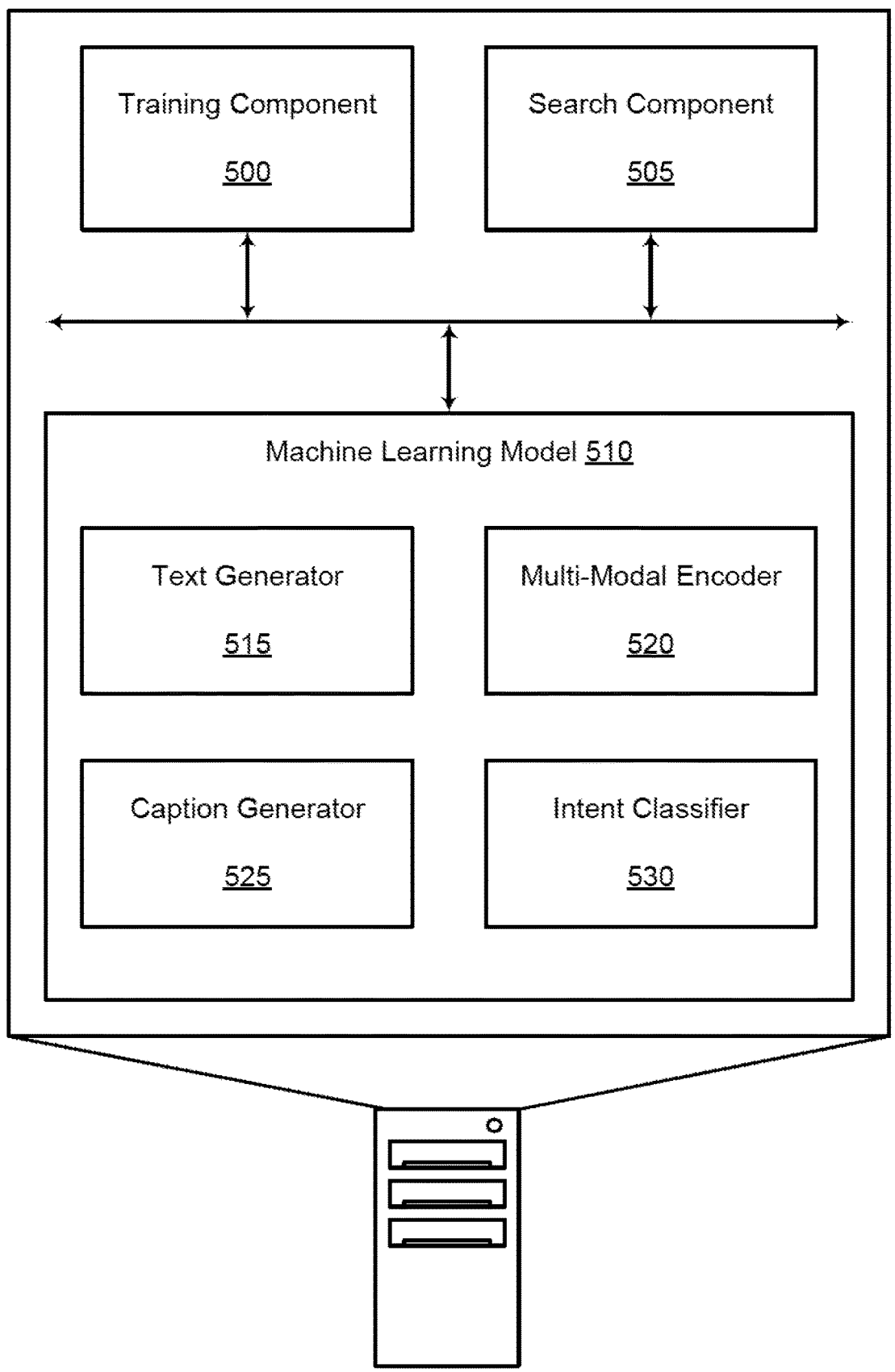
FIG. 5 shows an example of an image search apparatus according to aspects of the present disclosure.

Further detail regarding the architecture of image search apparatus 110 is provided with reference to FIGS. 4-5. Further detail regarding an image searching process is provided with reference to FIGS. 9-11. Further detail regarding a process for training a neural network is provided with reference to FIG. 12.

A cloud 115 is a computer network configured to provide on-demand availability of computer system resources, such as data storage and computing power. In some examples, the cloud 115 provides resources without active management by the user 100. The term cloud 115 is sometimes used to describe data centers available to many users 100 over the Internet. Some large cloud 115 networks have functions distributed over multiple locations from central servers. A server is designated an edge server if it has a direct or close connection to a user 100. In some cases, a cloud 115 is limited to a single organization. In other examples, the cloud 115 is available to many organizations. In one example, a cloud 115 includes a multi-layer communications network comprising multiple edge routers and core routers. In another example, a cloud 115 is based on a local collection of switches in a single physical location.

A database 120 is an organized collection of data. For example, database 120 stores data in a specified format known as a schema. In some cases, database 120 stores images in an image dataset. In some cases, image search apparatus 110 can retrieve images from the image dataset as results and/or second images. In some cases, image search apparatus 110 and user device 105 can store data to database 120, including, for example, initial queries, query histories, user inputs, critiques, preference statements, captions, expanded queries, and/or retrieved images. Database 120 may be structured as a single database, a distributed database, multiple distributed databases, or an emergency backup database. In some cases, a database controller may manage data storage and processing in database 120. In some cases, a user 100 interacts with the database controller. In other cases, the database controller may operate automatically without user interaction.

Figure 2:
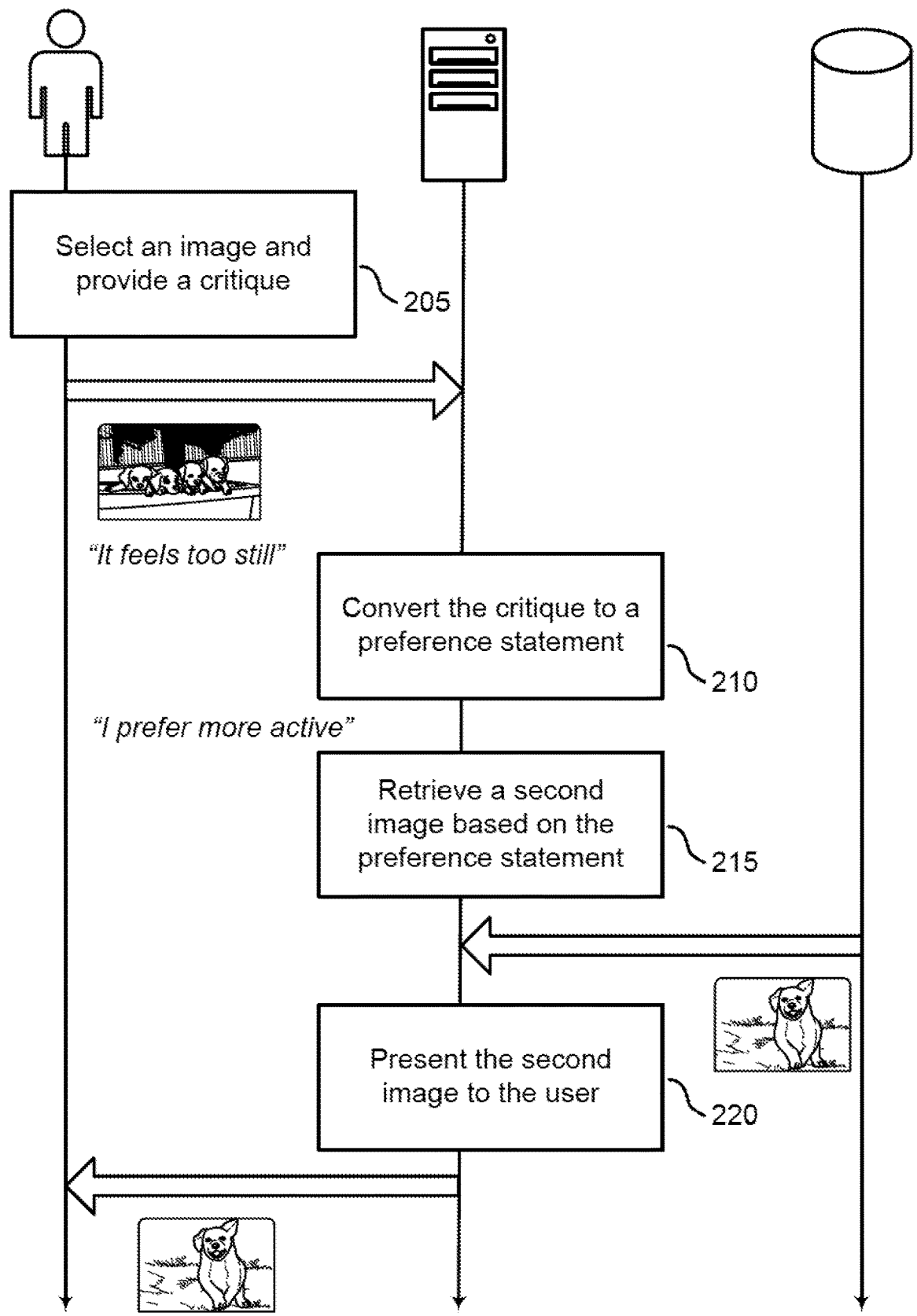
FIG. 2 shows an example of conversational image searching according to aspects of the present disclosure.

FIG. 2 shows an example of a conversational image search according to aspects of the present disclosure. Referring to FIG. 2., a user (e.g., user 100 of FIG. 1) can communicate with an image search apparatus (e.g., image search apparatus 110 of FIG. 1) to retrieve one or more second images from an image dataset (stored in, e.g., database 120 of FIG. 1) based on a combination of inputs (in this case, a selected reference image and a critique of the reference image). The image search apparatus can convert the critique into a preference statement and retrieve the one or more second images from the image dataset based at least in part on the preference statement.

At operation 205, the user selects an image and provides a critique. In some cases, the operations of this step refer to, or may be performed by, a user as described with reference to FIG. 1. For example, a user device can display a number of images to the user. The user can select one of the images as a reference image, and provide a critique of the reference image to the user device. For example, the reference image may depict a group of puppies, and the user may enter the critique, "It feels too still". For example, the user device can provide the reference image and the critique to an image search apparatus.

At operation 210, the system converts the critique to a preference statement. In some cases, the operations of this step refer to, or may be performed by, an image search apparatus as described with reference to FIG. 1. For example, the image search apparatus can receive the critique "It feels too still" from the user device and convert the critique into the preference statement "I prefer more active".

At operation 215, the system retrieves a second image based on the preference statement. In some cases, the operations of this step refer to, or may be performed by, an image search apparatus as described with reference to FIG. 1. For example, the image search apparatus can search an image dataset for images that are similar to a concatenation of the reference image and the preference statement and select one or more of those images as second images.

At operation 220, the system presents the second image to the user. In some cases, the operations of this step refer to, or may be performed by, an image search apparatus as described with reference to FIG. 1. For example, the image search apparatus can provide the one or more second images to a user device, and the user device can display the one or more second images to the user.

Figure 3:
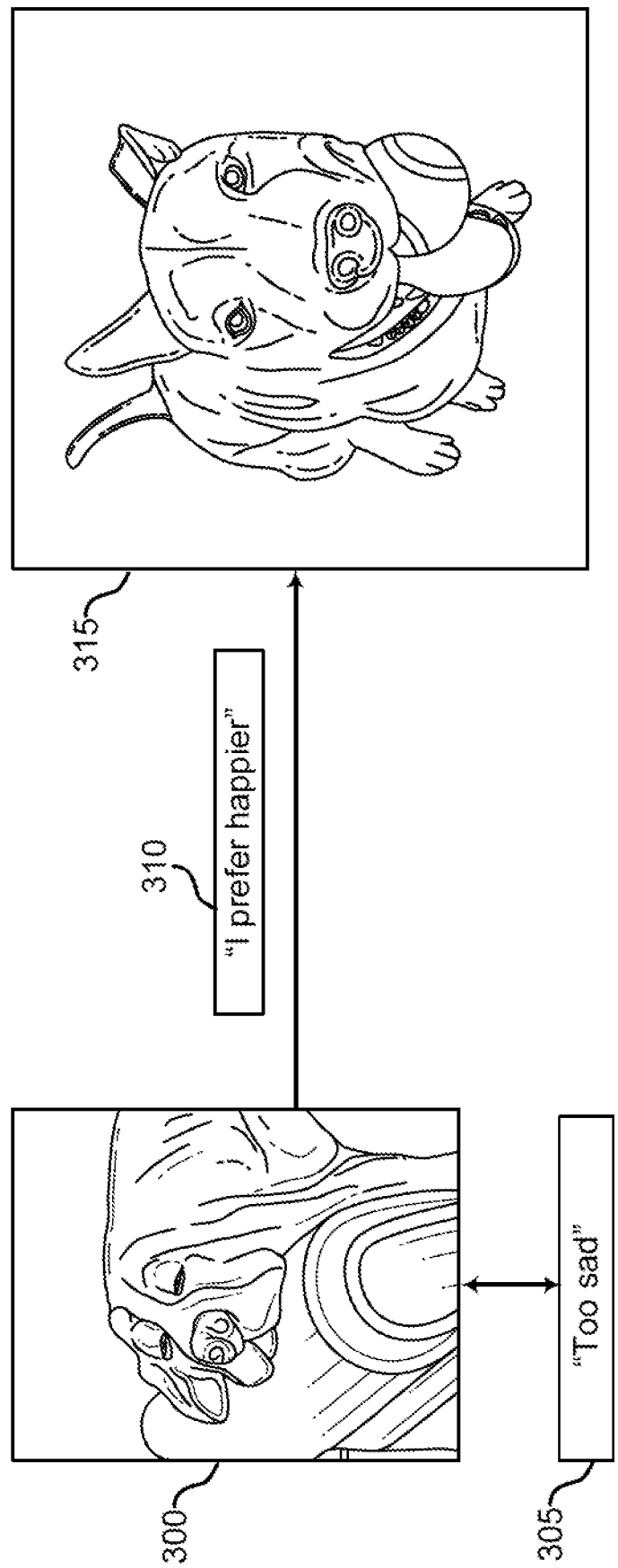
FIG. 3 shows an example of multi-modal image retrieval with cross-modal embeddings according to aspects of the present disclosure.

FIG. 3 shows an example of multi-modal image retrieval with cross-modal embeddings according to aspects of the present disclosure. The example shown includes reference image 300, critique 305, preference statement 310, and second image 315.

Reference image 300 is an example of, or includes aspects of, the corresponding element described with reference to FIGS. 6-8. Critique 305 is an example of, or includes aspects of, the corresponding element described with reference to FIGS. 6-8. Preference statement 310 is an example of, or includes aspects of, the corresponding element described with reference to FIGS. 6 and 7.

Referring to FIG. 3, a user device can display a reference image 300 to a user. The user can provide a user input that includes a critique 305 of the reference image 300. An image search apparatus can receive the reference image 300 and the critique 305 and generate a preference statement 310 based on the critique. The image search apparatus can retrieve a second image 315 from an image dataset based on the reference image 300 and the preference statement 315, and can display the second image 315 to the user.

System Architecture

FIG. 4 shows an example of a computing device 400 for image searching according to aspects of the present disclosure. The example shown includes processor(s) 405, memory subsystem 410, communication interface 415, I/O interface 420, user interface component(s), and channel 430. In some embodiments, the computing device 400 is an example of, or includes aspects of, image search apparatus 110 of FIG. 1. In some embodiments, computing device 400 includes one or more processors 405 that can execute instructions stored in memory subsystem 410 to receive a search query comprising user input for a reference image, convert the user input for the reference image to a preference statement using a machine learning model, encode the preference statement in an embedding space to obtain an encoded preference statement, combine the encoded preference statement with an encoded reference image representing the reference image in the embedding space to obtain a multi-modal search encoding, and perform a search operation using the multi-modal search encoding to retrieve a second image, where the second image differs from the reference image based on the user input for the reference image.

Computing device 400 can be a personal computer, laptop computer, mainframe computer, palmtop computer, personal assistant, mobile device, or any other suitable processing apparatus.

Computing device 400 includes one or more processors 405. A processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

Memory subsystem 410 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

Communication interface 415 operates at the boundary between communicating entities (such as computing device 400, one or more user devices, a cloud, and one or more databases) and channel 430 and can record and process communications. Communication interface 415 is provided herein to enable a processing system coupled to a transceiver (e.g., a transmitter and/or a receiver). In some examples, the transceiver is configured to transmit (or send) and receive signals for a communications device via an antenna.

I/O interface 420 is controlled by an I/O controller to manage input and output signals for computing system 400. I/O interface 420 may also manage peripherals not integrated into computing system 400. In some cases, I/O interface 420 may represent a physical connection or port to an external peripheral. In some cases, the I/O controller may utilize an operating system such as iOS®, ANDROID®, MS-DOS®, MS-WINDOWS®, OS/2®, UNIX®, LINUX®, or another known operating system. In other cases, the I/O controller may represent or interact with a modem, a keyboard, a mouse, a touchscreen, or a similar device. In some cases, the I/O controller may be implemented as part of a processor. In some cases, a user may interact with a device I/O interface 420 or via hardware components controlled by the I/O controller.

User interface component(s) 425 enable a user to interact with computing device 400. In some embodiments, user interface component(s) 425 can include an audio device, such as an external speaker system, an external display device such as a display screen, or an input device (e.g., a remote control device interfaced with a user interface directly or through the I/O controller). In some cases, user interface component(s) 425 can include a graphical user interface (GUI).

FIG. 5 shows an example of an image search apparatus according to aspects of the present disclosure. The example shown includes training component 500, search component 505, and machine learning model 510. In some embodiments, the image search apparatus 500 is an example of, or includes aspects of, the computing system 400. For example, in some cases, training component 500, search component 505, and machine learning model 510 can be implemented as hardware circuits that interact with components similar to the ones illustrated in FIG. 4 via a channel. For example, in some cases, training component 500, search component 505, and machine learning model 510 can be implemented as software stored in a memory device.

According to some aspects, training component 500 receives training data including a set of input statements and a set of ground truth preference statements corresponding to the input statements. In some examples, training component 500 computes a loss function for the machine learning model 510 by comparing a preference statement to a corresponding preference statement from the set of ground truth preference statements. In some examples, training component 500 trains the machine learning model 510 using the training data to generate a trained machine learning model 510, where the trained machine learning model 510 is configured to perform a search operation to retrieve an image that matches a query preference statement corresponding to a user input.

In some examples, training component 500 pre-trains the machine learning model 510 for a set of natural language processing tasks, where the parameters of the machine learning model 510 are updated after the pre-training. In some examples, training component 500 receives multi-modal training data for a multi-modal encoder 520, where the multi-modal training data includes images and image descriptions. In some examples, training component 500 trains the multi-modal encoder 520 using the multi-modal training data.

In some examples, training component 500 trains an intent classifier 530 to determine whether a text includes a critique of an image. In some examples, search component 505 bypass a critique conversion process based on the determination. In some examples, training component 500 updates parameters of the machine learning model 510 based on a user selection.

According to some aspects, search component 505 receives a search query including user input for a reference image. In some examples, search component 505 performs a search operation using a multi-modal search encoding to retrieve a second image, where the second image differs from the reference image based on the user input for the reference image. For example, the second image can have characteristics that are similar to the user input but not to the reference image.

In some examples, search component 505 receives an additional search query including a user input for the second image. In some examples, search component 505 retrieves an additional second image based on the additional preference statement. In some examples, search component 505 retrieves an additional second image based on the additional search query.

In some examples, search component 505 compares each of a set of encoded images to the multi-modal search encoding to obtain a similarity score for each of the set of encoded images. In some examples, search component 505 selects the second image from among the set of encoded images based on the similarity score corresponding to the second image.

In some examples, search component 505 retrieves a set of images based on the multi-modal search encoding. In some examples, search component 505 receives a user selection identifying one of the set of images. In some examples, search component 505 receives a subsequent search query including a subsequent user input for the set of images. In some examples, search component 505 retrieves a set of additional images based on the subsequent critique.

According to some aspects, search component 505 performs a search operation to retrieve an image that matches one or more query preference statements. In some examples, search component 505 retrieves a set of images based on the search operation. In some examples, search component 505 receives a user selection identifying one of the set of images.

In one aspect, machine learning model 510 includes text generator 515, multi-modal encoder 520, caption generator 525, and intent classifier 530. In some cases, each of text generator 515, multi-modal encoder 520, caption generator 525, and intent classifier 530 include one or more artificial neural networks.

According to some aspects, the one or more neural networks included in text generator 515 includes a transformer. A transformer is a deep learning network that is useful in natural language processing applications and that operates according to an attention mechanism. An attention mechanism is a method of placing differing levels of importance on different elements of an input. Calculating attention can be a three-step process of computing the similarity between a query and key vectors obtained from an input to generate attention weights, using a softmax function to normalize the attention weights, and weighing the attention weights in together with the corresponding values. A softmax function is used as the activation function of a neural network to normalize the output of the network to a probability distribution over predicted output classes. After applying the softmax function, each component of the feature map is in the interval (0, 1) and the components add up to one. These values are interpreted as probabilities.

Transformers differentially weight the significance of tokens (i.e., a discrete unit) in a text input. Transformers are similar to recurrent neural networks in that they are designed to handle sequential input data, such as natural language, but use the attention mechanism rather than the token input order to provide context for a token's position in an input sequence, which means that a transformer can process sentences in an out-of-order manner, which allows for increased parallelization and reduced training time. An example of a transformer-based neural network architecture is Generative Pre-trained Transformer 3 (GPT-3). According to some aspects, text generator 515 is a GPT-3 model.

According to some aspects, text generator 515 converts a user input for a reference image to a preference statement using a machine learning model. In some cases, the term "user input" can refer to a critique. In some examples, text generator 515 converts a user input for a second image to an additional preference statement. According to some aspects, text generator 515 converts a user input of a set of input statements to a preference statement using a machine learning model.

According to some aspects, multi-modal encoder 520 includes a contrastive language-image pre-training (CLIP) model. CLIP is a neural network that is trained to efficiently learn visual concepts from natural language supervision. CLIP may be instructed in natural language to perform a variety of classification benchmarks without directly optimizing for the benchmarks' performance, in a manner building on "zero-shot" or zero-data learning. CLIP learns from unfiltered, highly varied, and highly noisy data—text paired with images found across the internet—in a zero-shot manner, but with an improved training efficiency, thus reducing the need for expensive and large labeled datasets. CLIP models may be applied to nearly arbitrary visual classification tasks so that the model may predict the likelihood of a text description being paired with a particular image, removing the need for users to design their own classifiers and the need for task-specific training data. For example, a CLIP model may be applied to a new task by inputting names of the task's visual concepts to the model's text encoder. The model can then output a linear classifier of CLIP's visual representations.

According to some aspects, multi-modal encoder 520 encodes the preference statement in an embedding space to obtain an encoded preference statement. The term "embedding space" in a machine learning context refers to a vector space that is used in a word embedding. In some embodiments, the vector space is multi-modal. For example, it can represent both words and images simultaneously. Embodiments of the disclosure use the multi-modal characteristic of the embedding space to match multi-modal queries (e.g., a reference image combined with text input) to images. Thus, the term "embedding space" includes vector spaces in which concepts from either one modality (e.g., words) or multiple modalities (e.g., images and words) can be represented. In some embodiments, concepts rep[resented in either text or image are positioned in the vector space in a manner such that similar concepts are located nearby.

A word embedding is a learned representation for text where words that have the same meaning have a similar representation. GloVe and Word2vec are examples of systems for obtaining a vector representation of words. GloVe is an unsupervised algorithm for training a network using on aggregated global word-word co-occurrence statistics from a corpus. Similarly, a Word2vec model may include a shallow neural network trained to reconstruct the linguistic context of words. GloVe and Word2vec models may take a large corpus of text and produces a vector space as output. In some cases, the vector space may have a large number of dimensions. Each word in the corpus is assigned a vector in the space. Word vectors are positioned in the vector space in a manner such that similar words are located nearby in the vector space. In some cases, an embedding space may include syntactic or context information in additional to semantic information for individual words.

In some examples, multi-modal encoder 520 encodes the reference image in the embedding space to obtain an encoded reference image. In some examples, multi-modal encoder 520 combines the encoded preference statement with the encoded reference image representing the reference image in the embedding space to obtain a multi-modal search encoding. In some examples, multi-modal encoder 520 encodes caption text in the embedding space to obtain an encoded caption, where the second image is retrieved by search component 505 based on the encoded caption.

According to some aspects, multi-modal encoder 520 encodes caption text in an embedding space to obtain an encoded caption, where an image is retrieved by search component 505 based on the encoded caption.

According to some aspects, caption generator 525 includes one or more convolutional neural networks. A convolutional neural network (CNN) is a class of ANN that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some aspects, caption generator 525 includes one or more recurrent neural networks. A recurrent neural network (RNN) is a class of ANN in which connections between nodes form a directed graph along an ordered (i.e., temporal) sequence. This enables an RNN to model temporally dynamic behavior such as predicting what element should come next in a sequence. Thus, an RNN is suitable for tasks that involve ordered sequences such as text recognition (where words are ordered in a sentence). The term RNN may include finite impulse recurrent networks (characterized by nodes forming a directed acyclic graph), and infinite impulse recurrent networks (characterized by nodes forming a directed cyclic graph).

According to some aspects, caption generator 525 generates a caption text based on the reference image and the preference statement. According to some aspects, caption generator 525 generates a caption text based on the reference image and the search query. For example, in some cases, caption generator 525 can receive a combination of image (such as a reference image) and text (such as a preference statement and/or search query) as input, encode to obtain a hidden representation, and decode the hidden representation to obtain the caption text. The term "hidden representation" refers to a machine-readable data representation of an input that are learned from a neural network's "hidden" (i.e., intermediate) layers and is produced by the network's output layer. As the neural network's understanding of the input improves as it is trained, the hidden representation is progressively differentiated from earlier iterations.

According to some aspects, intent classifier 530 determines that an additional search query does not include an image critique. In some examples, intent classifier 530 obtains a user input for a reference image by performing an intent classification on a search query.

According to some aspects, the image search apparatus of FIG. 5 can perform text-based image retrieval with cross-modal embeddings. For example, multi-modal encoder 520 can encode a free-form text query such as q="Photos of dogs in action" using a multi-modal encoding model (i.e., CLIP) such that $q_{enc}$=CLIP(q). Additionally, multi-modal encoder 520 can encode images i in an image dataset D using the multi-modal encoding model such that $i_{enc}$=CLIP(i). Search component 505 can compute a similarity score for the pairwise similarity between q and a single i via the formula Similarity(q, i)=cos($q_{enc}$, $i_{enc}$), and can therefore retrieve images from the image dataset based on the text q according to the formula Retriever(q, D)=argmax$_i$ Similarity(q, i)∀i∈D. According to some aspects, other similarity measures besides cosine can be used.

According to some aspects, the image search apparatus of FIG. 5 can perform multi-modal image retrieval with cross-modal embeddings. For example, multi-modal encoder 520 can encode reference image r and a search query q in a same embedding space using a multi-modal encoding model such that $r_{enc}$=CLIP(r) and $q_{enc}$=CLIP(q). Image search apparatus 110 can concatenate these embeddings to produce a multi-modal query or expanded query $q_m$: $q_m$=$r_{enc}$⊕$q_{enc}$. Multi-modal encoder 520 can produce a self-concatenated encoded embedding of each image i in an image dataset D until vector shapes are matched with $q_m$:$i_{enc}$=CLIP(i)⊕CLIP(i). Search component 505 can compute a similarity score for the pairwise similarity between q and a single i via the formula Similarity($q_m$,i)=cos($q_m$,$i_{enc}$) and can therefore retrieve images from the image dataset based on the multi-modal query $q_m$ according to the formula Retriever($q_m$,D) =argmax$_i$ Similarity($q_m$,i)∀i∈D.

According to some aspects, the image search apparatus of FIG. 5 can perform critique understanding with natural language generation. For example, intent classifier 530 can determine that an input user utterance u such as "It looks a bit boring" is a critique. Text generator 515 can transform the user utterance u into a positively stated preference statement. In some cases, text generator 515 controls the natural language generation of a language model by inserting a small set of examples in the model's prompt to transform the user utterance u into a preference statement. For example, the input for the language model can include the sum of n transformation examples (e.g., a fixed set of conditioning examples), the user utterance u, and a prompt for generating a positive preference (e.g., "I prefer"). Text generator 515 can then output a preference statement based on the input user utterance u.

Image Searching

A method for image searching is described. One or more aspects of the method include receiving a search query comprising user input for a reference image; converting the user input for the reference image to a preference statement using a machine learning model; encoding the preference statement in an embedding space to obtain an encoded preference statement; combining the encoded preference statement with an encoded reference image representing the reference image in the embedding space to obtain a multi-modal search encoding; and performing a search operation using the multi-modal search encoding to retrieve a second image, wherein the second image differs from the reference image based on the user input for the reference image.

Some examples of the method further include receiving an additional search query comprising a user input for the second image. Some examples further include converting the user input for the second image to an additional preference statement. Some examples further include retrieving an additional second image based on the additional preference statement.

Some examples of the method further include determining that an additional search query does not comprise an image critique. Some examples further include bypassing a critique conversion process based on the determination. Some examples further include retrieving an additional second image based on the additional search query.

Some examples of the method further include generating a caption text based on the reference image and the preference statement. Some examples further include encoding the caption text in the embedding space to obtain an encoded caption, wherein the second image is retrieved based at least in part on the encoded caption.

Some examples of the method further include obtaining the user input for the reference image by performing an intent classification on the search query. Some examples of the method further include encoding the reference image in the embedding space using a multi-modal encoder to obtain the encoded reference image, wherein the preference statement is encoded with the multi-modal encoder.

Some examples of the method further include comparing each of a plurality of encoded images to the multi-modal search encoding to obtain a similarity score for each of the plurality of encoded images. Some examples further include selecting the second image from among the plurality of encoded images based on the similarity score corresponding to the second image.

Some examples of the method further include retrieving a plurality of images based on the multi-modal search encoding. Some examples further include receiving a user selection identifying one of the plurality of images. Some examples further include receiving a subsequent search query comprising a subsequent user input for the plurality of images. Some examples further include retrieving a plurality of additional images based on the subsequent critique.

In some aspects, a loss function for the machine learning model is computed by comparing the preference statement to a corresponding preference statement from the plurality of ground truth preference statements. In some aspects, the machine learning model is trained by updating parameters of the machine learning model based on the loss function.

Figure 6:
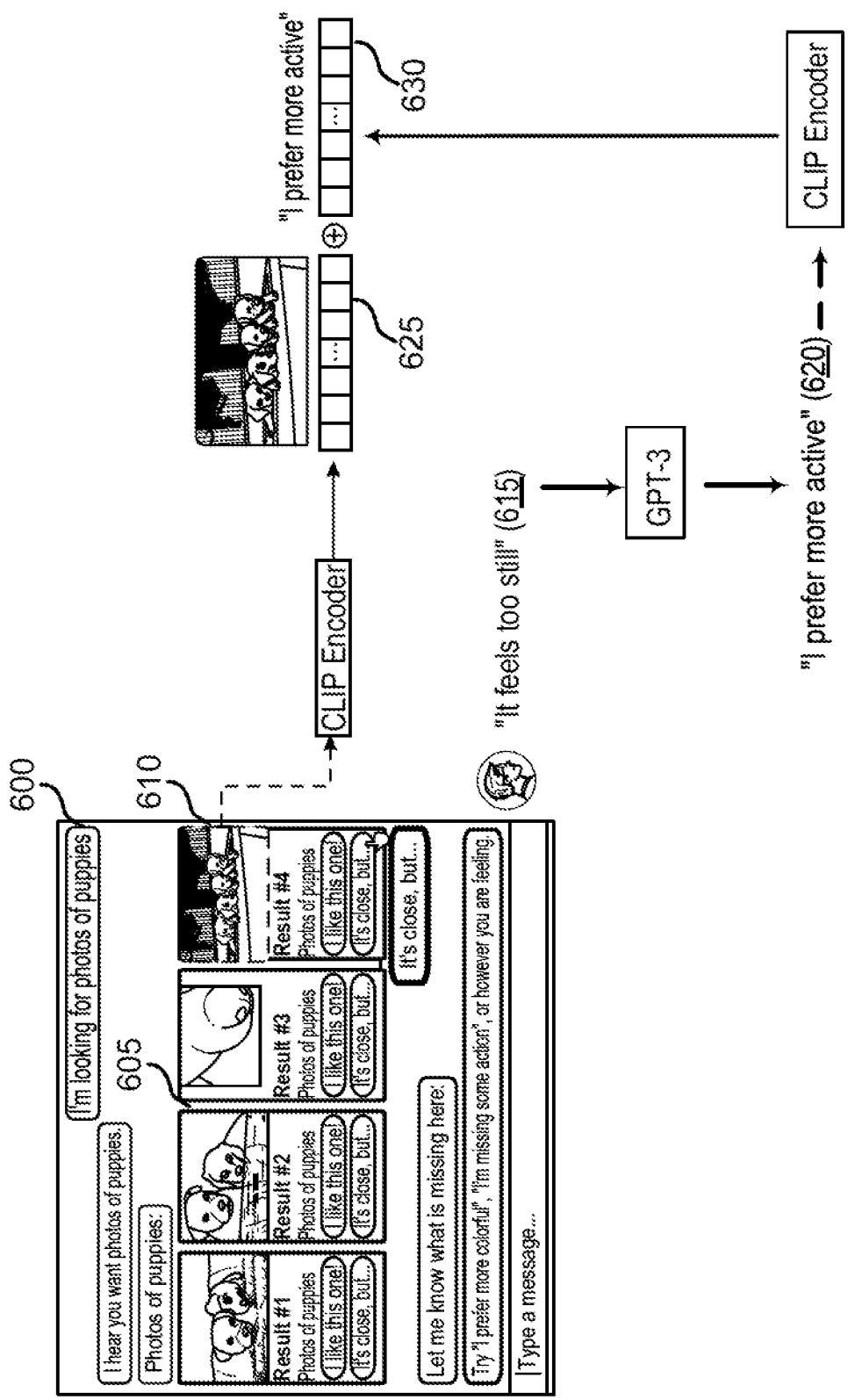
FIG. 6 shows an example of an image search process according to aspects of the present disclosure.

FIG. 6 shows an example of an image search process according to aspects of the present disclosure. The example shown includes initial query 600, results 605, reference image 610, critique 615, preference statement 620, first search query 625, and expanded query 630.

Initial query 600 is an example of, or includes aspects of, the corresponding element described with reference to FIGS. 7 and 8. Results 605 is an example of, or includes aspects of, the corresponding element described with reference to FIGS. 7 and 8. Reference image 610 is an example of, or includes aspects of, the corresponding element described with reference to FIGS. 3, 7, and 8. Critique 615 is an example of, or includes aspects of, the corresponding element described with reference to FIGS. 3, 7, and 8. Preference statement 620 is an example of, or includes aspects of, the corresponding element described with reference to FIGS. 3 and 7. Encoded reference image 625 is an example of, or includes aspects of, the corresponding element described with reference to FIGS. 7 and 8. Expanded query 630 is an example of, or includes aspects of, the corresponding element described with reference to FIGS. 7 and 8.

Referring to FIG. 6, a user can enter an initial query 600 into a GUI of an image search system, and an image search apparatus can search for and display results 605 in response to the initial query. The user can select a reference image 610 from among the results 605, which initiates conversational input prompts between the user and the image search system. The user enters a search query that includes a user input (e.g., critique 615). The critique 615 is provided to a text generator (e.g., a GPT-3 model), and the text generator converts the critique 615 into the preference statement 620. The reference image 610 and the preference statement 620 are provided to a multi-modal encoder (e.g., a CLIP model) for encoding. The multi-modal encoder can form a first search query 625 that includes the encoded reference image (e.g., a vector representation of the reference image 610). The multi-modal encoder can form an expanded query 630 that includes a combination of the encoded reference image and the encoded preference statement (e.g., a vector representation of the concatenation of the encoded reference image and the encoded preference statement). The expanded query 630 can also be referred to as a multi-modal search encoding.

Figure 7:
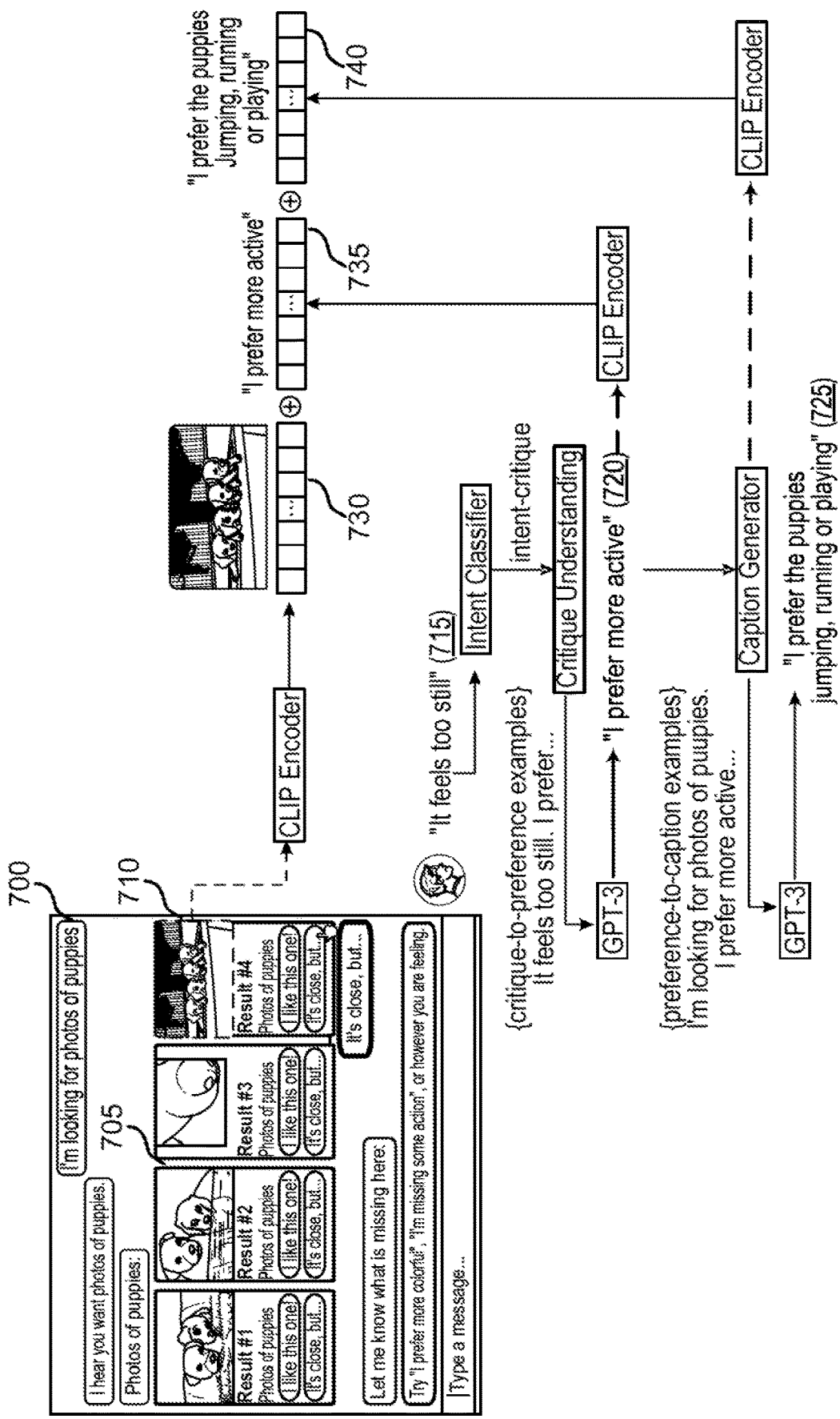
FIG. 7 shows an example of composing a multi-modal search encoding according to aspects of the present disclosure.

FIG. 7 shows an example of composing a multi-modal search encoding according to aspects of the present disclosure. The example shown includes initial query 700, results 705, reference image 710, user input 715, preference statement 720, caption 725, first search query 730, second search query 730, and expanded query 735.

Initial query 700 is an example of, or includes aspects of, the corresponding element described with reference to FIGS. 6 and 8. Results 705 is an example of, or includes aspects of, the corresponding element described with reference to FIGS. 6 and 8. Reference image 710 is an example of, or includes aspects of, the corresponding element described with reference to FIGS. 3, 6, and 8. User input 715 is an example of, or includes aspects of, the corresponding element described with reference to FIGS. 3, 6, and 8. Preference statement 720 is an example of, or includes aspects of, the corresponding element described with reference to FIGS. 3 and 6. First search query 730 is an example of, or includes aspects of, the corresponding element described with reference to FIGS. 6 and 8. Second search query 735 is an example of, or includes aspects of, expanded search query described with reference to FIG. 6 and the corresponding element described with reference to FIG. 8. Expanded query 740 is an example of, or includes aspects of, the corresponding element described with reference to FIG. 8.

Referring to FIG. 7, a user can enter an initial query 700 into a GUI of an image search system, and an image search apparatus can search for and display results 705 in response to the initial query. The user can select a reference image 710 from among the results 705, which initiates conversational input prompts between the user and the image search system. The user enters a search query that includes a user input 715. The user input 715 is provided to an input classifier to determine whether the user input 715 should be classified as a critique. After the intent classifier determines that the user input 715 is a critique, the user input 715 is provided to a text generator (e.g., a GPT-3 model), and the text generator converts the user input 715 into a preference statement 720. The reference image 710 and the preference statement 720 are provided as input to a caption generator, which generates a caption 725 based on the input. The reference image 710, the preference statement 720, and the caption 725 are provided to a multi-modal encoder (e.g., a CLIP model) for encoding. The multi-modal encoder can form a first search query 730 that includes the encoded reference image (e.g., a vector representation of the reference image 710). The multi-modal encoder can form a second search query 735 that includes a combination of the encoded reference image and the encoded preference statement (e.g., a vector representation of the concatenation of the encoded reference image and the encoded preference statement). The multi-modal encoder can form an expanded query 740 that includes a combination of the encoded reference image, the encoded preference statement, and the encoded caption (e.g., a vector representation of the concatenation of the encoded reference image, the encoded preference statement, and the encoded caption) The expanded query 730 can also be referred to as a multi-modal search encoding.

Figure 8:
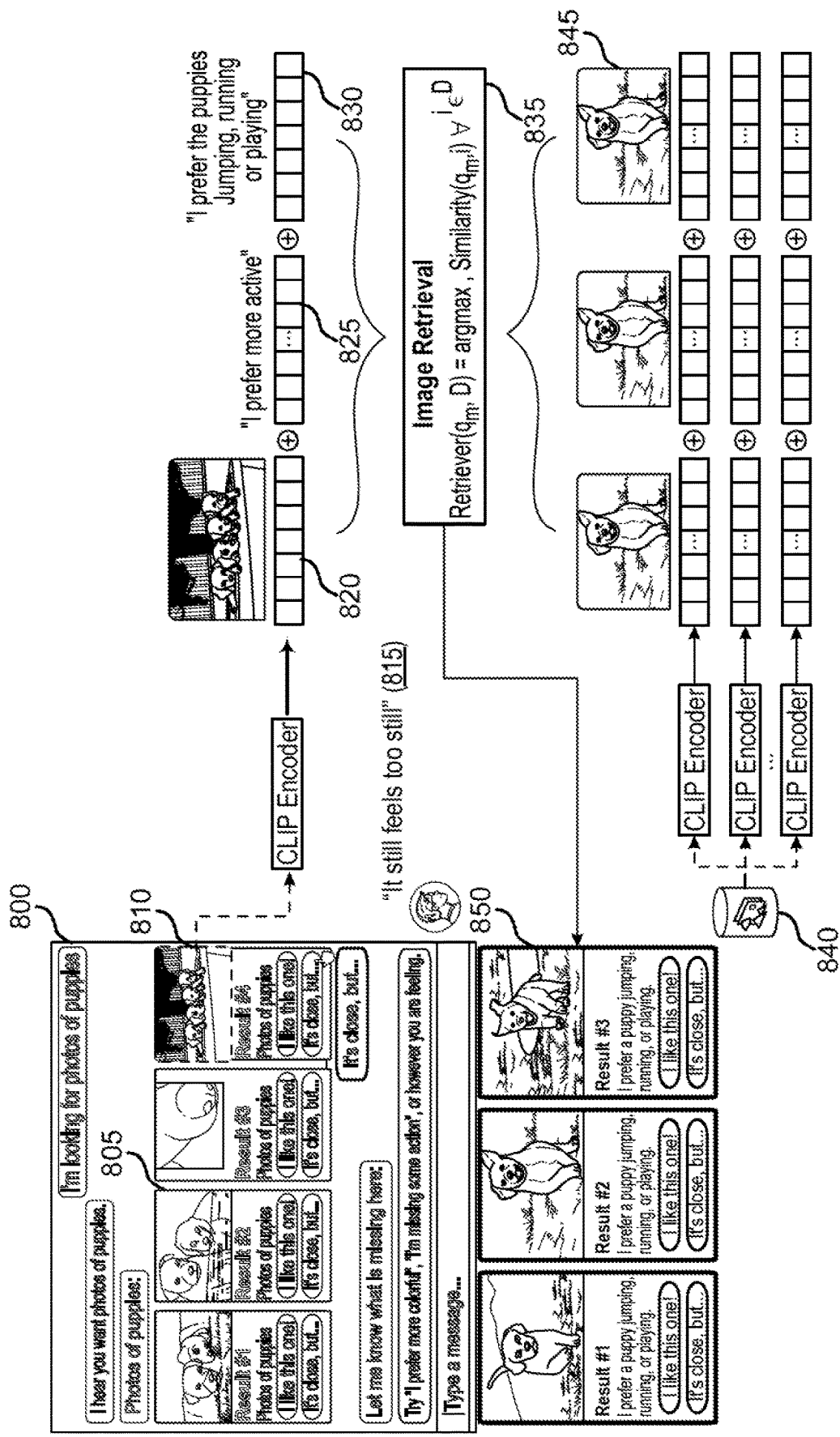
FIG. 8 shows an example of retrieving images based on a similarity score according to aspects of the present disclosure.

FIG. 8 shows an example of retrieving images based on a similarity score according to aspects of the present disclosure. The example shown includes initial query 800, results 805, reference image 810, critique 815, first search query 820, second search query 825, expanded query 830, retrieval function 835, image dataset 840, encoded search images 845, and retrieved images 850.

Initial query 800 is an example of, or includes aspects of, the corresponding element described with reference to FIGS. 6 and 7. Results 805 is an example of, or includes aspects of, the corresponding element described with reference to FIGS. 6 and 7. Reference image 810 is an example of, or includes aspects of, the corresponding element described with reference to FIGS. 3, 6, and 7. Critique 815 is an example of, or includes aspects of, the corresponding element described with reference to FIGS. 3, 6, and 7. First search query 820 is an example of, or includes aspects of, the corresponding element described with reference to FIGS. 6-7. Second search query 825 is an example of, or includes aspects of, expanded search query described with reference to FIG. 6 and the corresponding element described with reference to FIG. 7. Expanded query 830 is an example of, or includes aspects of, the corresponding element described with reference to FIG. 7. A repeated discussion of similar elements that have been described with reference to FIGS. 6 and 7 will be omitted.

Referring to FIG. 8, a search component uses retrieval function 835 to search encoded search images 845 in image dataset 840 for images that are similar to expanded query 830 based on a computed similarity score. The search component displays one or more second images 850 to a user, where the second images 850 have been retrieved based on the retrieval function 835.

Figure 9:
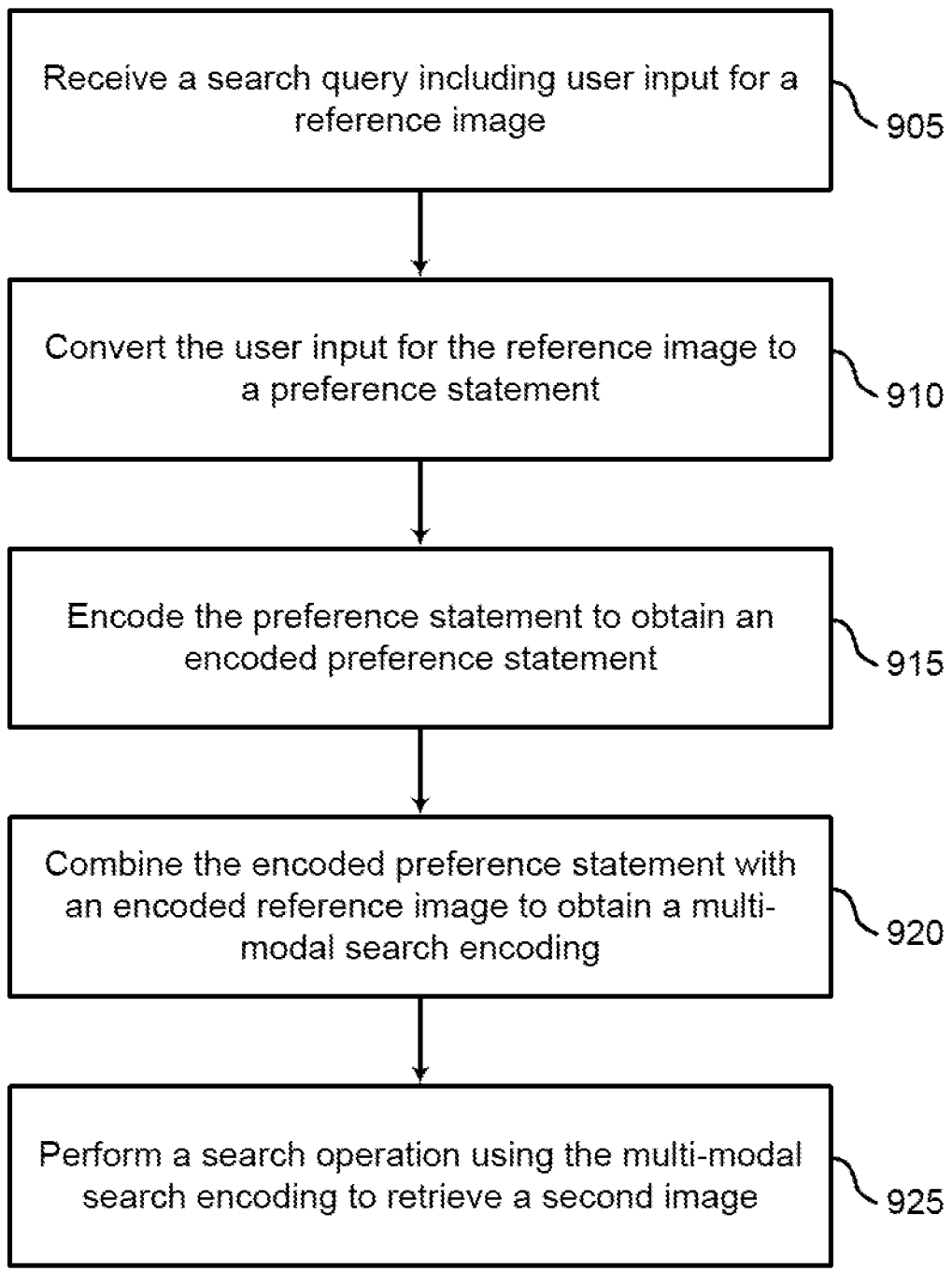
FIG. 9 shows an example of an image search process according to aspects of the present disclosure.

FIG. 9 shows an example of a multi-modal image search process according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system receives a search query including user input for a reference image. In some cases, the operations of this step refer to, or may be performed by, a search component as described with reference to FIG. 5. For example, a search component can receive a search query as described with reference to FIGS. 6-8. In some cases, the user input can be a critique (e.g., a negative utterance in natural language). An example critique is "It feels too still".

At operation 910, the system converts the user input for the reference image to a preference statement. In some cases, the operations of this step refer to, or may be performed by, a text generator as described with reference to FIG. 5. For example, in some embodiments, a text generator can convert the user input for the reference image as described with reference to FIGS. 5-8. In some cases, the preference statement can be a positive statement that is an inversion of a critique. For example, the critique "It feels too still" can be converted into the preference statement "I prefer more active".

At operation 915, the system encodes the preference statement to obtain an encoded preference statement. In some cases, the operations of this step refer to, or may be performed by, a multi-modal encoder as described with reference to FIG. 5. For example, in some embodiments, a multi-modal encoder can encode the preference statement as described with reference to FIGS. 5-8.

At operation 920, the system combines the encoded preference statement with an encoded reference image to obtain a multi-modal search encoding. In some cases, the operations of this step refer to, or may be performed by, a multi-modal encoder as described with reference to FIG. 5. For example, in some embodiments, a multi-modal encoder can combine the encoded preference statement with an encoded reference image as described with reference to FIGS. 5-8.

At operation 925, the system performs a search operation using the multi-modal search encoding to retrieve a second image. In some cases, the operations of this step refer to, or may be performed by, a search component as described with reference to FIG. 5. For example, in some embodiments, a search component can perform a search operation to retrieve a second image as described with reference to FIGS. 2-3, 5, and 8.

Figure 10:
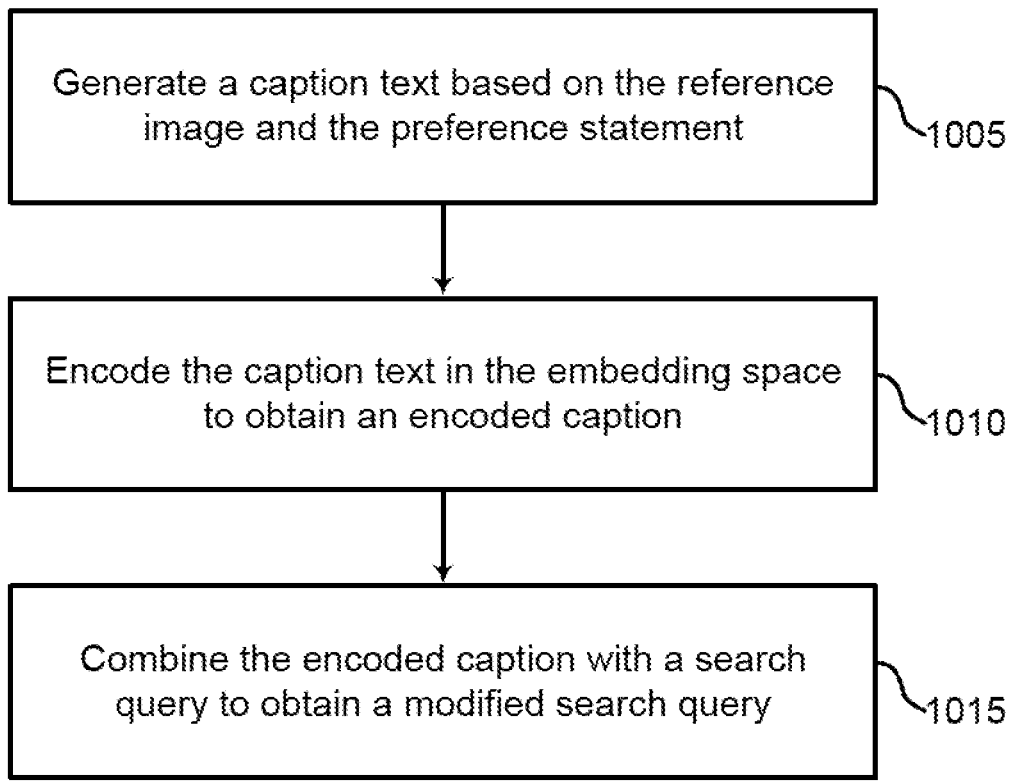
FIG. 10 shows an example of caption-based image searching according to aspects of the present disclosure.

FIG. 10 shows an example of caption-based image searching according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system generates a caption text based on the reference image and the preference statement. In some cases, the operations of this step refer to, or may be performed by, a caption generator as described with reference to FIG. 5. For example, in some embodiments, a caption generator can generate the caption text as described with reference to FIGS. 5 and 7-8.

At operation 1010, the system encodes the caption text in the embedding space to obtain an encoded caption. In some cases, the operations of this step refer to, or may be performed by, a multi-modal encoder as described with reference to FIG. 5. For example, in some embodiments, the multi-modal encoder can encode the caption text as described with reference to FIGS. 5 and 7-8.

At operation 1015, the system combines the encoded caption with a search query to obtain a modified search query. In some cases, the operations of this step refer to, or may be performed by, a search component as described with reference to FIG. 5. For example, in some embodiments, search component can combine the encoded caption with a search query as described with reference to FIGS. 5 and 7-8.

Figure 11:
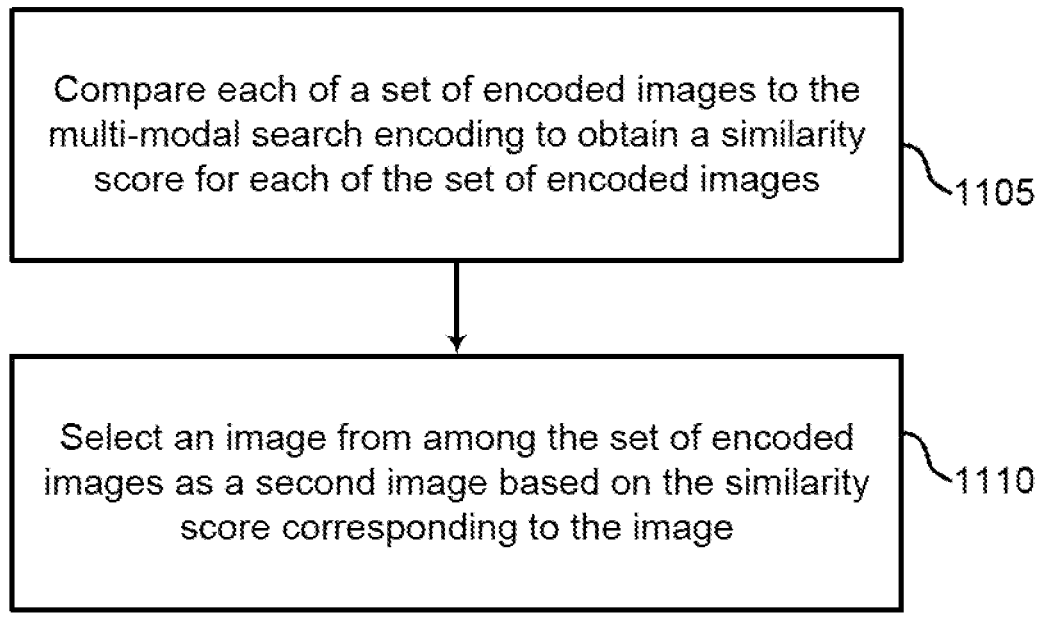
FIG. 11 shows an example of similarity score-based image searching according to aspects of the present disclosure.

FIG. 11 shows an example of similarity score-based image searching according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system compares each of a set of encoded images to the multi-modal search encoding to obtain a similarity score for each of the set of encoded images. In some cases, the operations of this step refer to, or may be performed by, a search component as described with reference to FIG. 5. For example, in some embodiments, the search component can compare each of a set of encoded images to the multi-modal search encoding as described with reference to FIGS. 5 and 8.

At operation 1110, the system selects an image from among the set of encoded images as a second image based on the similarity score corresponding to the image. In some cases, the operations of this step refer to, or may be performed by, a search component as described with reference to FIG. 5. For example, in some embodiments, the search component can select the second image from among the set of encoded images as described with reference to FIGS. 5 and 8.

Training

A method for training a neural network is described. One or more aspects of the method include receiving training data comprising a plurality of input statements and a plurality of ground truth preference statements corresponding to the input statements; converting a user input of the plurality of input statements to a preference statement using a machine learning model; computing a loss function for the machine learning model by comparing the preference statement to a corresponding preference statement from the plurality of ground truth preference statements; and training the machine learning model using the training data to generate a trained machine learning model, the trained machine learning model being configured to perform a search operation to retrieve an image that matches a query preference statement corresponding to a user input.

Some examples of the method further include pre-training the machine learning model for a plurality of natural language processing tasks, wherein the parameters of the machine learning model are updated after the pre-training.

Some examples of the method further include receiving multi-modal training data for a multi-modal encoder, wherein the multi-modal training data comprises images and image descriptions. Some examples further include training the multi-modal encoder using the multi-modal training data.

Some examples of the method further include training an intent classifier to determine whether a text comprises a critique of an image.

Some examples of the method further include generating a caption text based on a reference image and the search query. Some examples further include encoding the caption text in an embedding space to obtain an encoded caption, wherein the image is retrieved based at least in part on the encoded caption.

Figure 12:
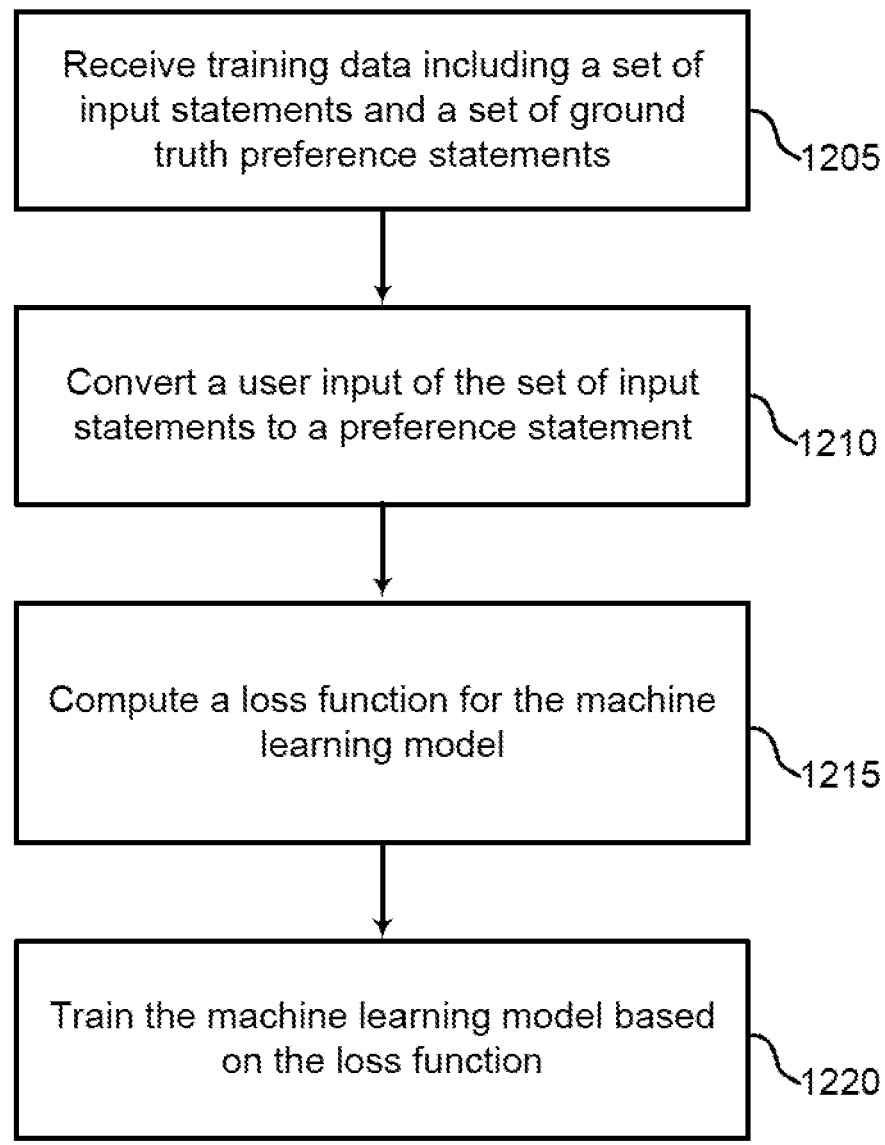
FIG. 12 shows an example of a method for training a neural network according to aspects of the present disclosure.

FIG. 12 shows an example of a method 1200 for training a neural network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system receives training data including a set of input statements and a set of ground truth preference statements corresponding to the input statements. In some cases, the operations of this step refer to, or may be performed by, a training component as described with reference to FIG. 5. For example, a training component can receive training data as described with reference to FIGS. 1 and 5.

At operation 1210, the system converts a user input of the set of input statements to a preference statement using a machine learning model. In some cases, the operations of this step refer to, or may be performed by, a text generator as described with reference to FIG. 5. For example, the text generator can convert the user input as described with reference to FIGS. 5-8.

At operation 1215, the system computes a loss function for the machine learning model by comparing the preference statement to a corresponding preference statement from the set of ground truth preference statements. In some cases, the operations of this step refer to, or may be performed by, a training component as described with reference to FIG. 5. For example, the training component can compute the loss function as described with reference to FIGS. 1 and 5.

At operation 1220, the system trains the machine learning model using the training data to generate a trained machine learning model. In some cases, the operations of this step refer to, or may be performed by, a training component as described with reference to FIG. 5. For example, the training component can train the machine learning model as described with reference to FIGS. 1 and 5.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image searching, comprising:
receiving a user input for a reference image, wherein the user input comprises a critique of the reference image, and wherein the critique comprises a natural language statement expressing a negative opinion relating to the reference image;
modifying the user input by generating a preference statement based on the critique using a machine learning language model, wherein the preference statement comprises a natural language statement of a positive preference corresponding to the reference image, and wherein the positive preference is an inversion of the negative opinion;
encoding, using a multi-modal encoder, the preference statement in a multi-modal embedding space to obtain an encoded preference statement;
combining the encoded preference statement with an encoded reference image representing the reference image in the multi-modal embedding space to obtain a multi-modal search encoding; and
performing a search operation using the multi-modal search encoding to retrieve a two-dimensional image, wherein the two-dimensional image differs from the reference image based on the user input for the reference image.

2. The method of claim 1, further comprising:
receiving an additional user input for the two-dimensional image;
generating an additional preference statement based on the additional user input using the machine learning language model; and
retrieving a third image based on the additional preference statement.

3. The method of claim 1, further comprising:
determining that an additional user input does not comprise an image critique;
bypassing a preference statement generation process based on the determination; and
retrieving a third image based on the additional user input.

4. The method of claim 1, further comprising:
identifying the reference image in response to a search query;
generating a caption text based on the search query and the preference statement; and
encoding the caption text in the multi-modal embedding space to obtain an encoded caption, wherein the multi-modal search encoding further comprises the encoded caption.

5. The method of claim 1, further comprising:
determining that the user input for the reference image comprises the critique of the reference image using an intent classifier.

6. The method of claim 1, further comprising:
encoding, using the multi-modal encoder, the reference image in the multi-modal embedding space to obtain the encoded reference image.

7. The method of claim 1, further comprising:
comparing each of a plurality of encoded images to the multi-modal search encoding to obtain a similarity score for each of the plurality of encoded images; and
selecting the two-dimensional image from among the plurality of encoded images based on a similarity score corresponding to the two-dimensional image.

8. The method of claim 1, further comprising:
retrieving a plurality of images based on the multi-modal search encoding;
receiving a subsequent user input for an image of the plurality of images; and
retrieving a plurality of additional images based on the subsequent user input.

9. The method of claim 1, wherein:
a loss function for the machine learning language model is computed by comparing the preference statement to a corresponding preference statement from a plurality of ground truth preference statements; and
the machine learning language model is trained by updating parameters of the machine learning model based on the loss function.

10. A non-transitory computer readable medium storing instructions that, when executed by a processor, cause the processor to:
receive, for training a machine learning language model, training data comprising an input statement and a ground truth preference statement corresponding to the input statement, wherein the input statement comprises a critique comprising a natural language statement expressing a negative opinion and wherein the ground truth preference statement comprises a natural language statement expressing a positive preference that is an inversion of the negative opinion;
modify the input statement by generating a preference statement based on the critique using the machine learning language model, wherein the preference statement comprises a natural language statement of a positive preference corresponding to the negative opinion; and
train the machine learning language model using the preference statement and the ground truth preference statement to generate a trained machine learning model, the trained machine learning model being configured to perform a search operation to retrieve a two-dimensional image that matches a query preference statement corresponding to a user input.

11. The non-transitory computer readable medium of claim 10, wherein the instructions further cause the processor to:
compute a loss function for the machine learning language model by comparing the preference statement to the ground truth preference statement, wherein the machine learning language model is trained by updating parameters of the machine learning language model based on the loss function.

12. The non-transitory computer readable medium of claim 10, wherein the instructions further cause the processor to:
receive multi-modal training data for a multi-modal encoder, wherein the multi-modal training data comprises images and image descriptions; and
train the multi-modal encoder using the multi-modal training data to encode the query preference statement to obtain an encoded preference statement in a multi-modal embedding space.

13. The non-transitory computer readable medium of claim 10, wherein the instructions further cause the processor to:
train an intent classifier to determine whether a text comprises a critique of an image.

14. The non-transitory computer readable medium of claim 10, wherein the instructions further cause the processor to:

generate a caption text based on the query preference statement and a search query for the image that matches the query preference statement; and encode the caption text in a multi-modal embedding space to obtain an encoded caption, wherein the two-dimensional image that matches the query preference statement is retrieved based at least in part on the encoded caption.

15. The non-transitory computer readable medium of claim 10, wherein:

a search operation is performed to retrieve a two-dimensional image that matches one or more query preference statements;

a plurality of two-dimensional images are retrieved based on the search operation;

a user selection is received identifying one of the plurality of two-dimensional images; and parameters of the machine learning language model are updated based on the user selection.

16. A system comprising:

one or more processors; and one or more memory components coupled with the one or more processors, the one or more processors configured to:

receive a user input for a reference image, wherein the user input comprises a critique of the reference image, and wherein the critique comprises a negative natural language statement expressing a negative opinion relating to the reference image;

modify the user input by generating a preference statement based on the critique using a machine learning language model, wherein the preference statement comprises a natural language statement of a positive preference corresponding to the reference image, and wherein the positive preference is an inversion of the negative opinion;

encode the preference statement in a multi-modal embedding space to obtain an encoded preference statement;

combine the encoded preference statement with an encoded reference image representing the reference image in the multi-modal embedding space to obtain a multi-modal search encoding; and perform a search operation using the multi-modal search encoding to retrieve a two-dimensional image, wherein the two-dimensional image differs from the reference image based on the user input for the reference image.

17. The system of claim 16, the system further comprising:

an intent classifier configured to determine that the critique expresses the negative opinion.

18. The system of claim 16, the system further comprising:

a caption generator configured to generate a caption text based on a search query for the reference image and the preference statement.

19. The system of claim 16, the system further comprising:

a query component configured to receive the user input for the reference image.

20. The system of claim 16, the system further comprising:

a multi-modal encoder configured to obtain the encoded preference statement.

* * * * *